(12) United States Patent
Bussani et al.

(10) Patent No.: US 8,132,235 B2
(45) Date of Patent: Mar. 6, 2012

(54) METHOD, SYSTEM, AND COMPUTER PROGRAM PRODUCT FOR PROVIDING E-TOKEN BASED ACCESS CONTROL FOR VIRTUAL WORLD SPACES

(75) Inventors: Anthony Bussani, Adliswil (CH); Dirk Husemann, Einsiedeln (CH); Ansgar Schmidt, Leinfelden-Echterdingen (DE); Dieter Sommer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/062,044

(22) Filed: Apr. 3, 2008

(65) Prior Publication Data
US 2009/0254747 A1    Oct. 8, 2009

(51) Int. Cl.
*H04L 29/06*     (2006.01)
*G06F 15/173*   (2006.01)
*H04L 9/32*       (2006.01)

(52) U.S. Cl. .............. 726/3; 709/223; 713/168; 726/9
(58) Field of Classification Search .................. None
See application file for complete search history.

(56) References Cited

U.S. PATENT DOCUMENTS

| | | | |
|---|---|---|---|
| 7,865,718 B2* | 1/2011 | Fukuta et al. | 713/153 |
| 2002/0054094 A1* | 5/2002 | Matsuda | 345/753 |
| 2004/0008666 A1* | 1/2004 | Hardjono | 370/352 |
| 2008/0009345 A1* | 1/2008 | Bailey et al. | 463/29 |
| 2009/0117883 A1* | 5/2009 | Coffing et al. | 455/414.1 |
| 2009/0119764 A1* | 5/2009 | Applewhite et al. | 726/9 |
| 2009/0157876 A1* | 6/2009 | Lection | 709/225 |

\* cited by examiner

*Primary Examiner* — Nathan Flynn
*Assistant Examiner* — Trang Doan
(74) *Attorney, Agent, or Firm* — Cantor Colburn LLP; Daniel Morris

(57) ABSTRACT

A method for providing e-token based access control to virtual world (VW) spaces includes intercepting a request from a first VW member to invite a second VW member to a VW space within a VW network, the request intercepted outside of the VW network. The access controls also include using a secret code associated with the first member to generate an e-token that includes an identifier of the second member and the space. The access controls further include sending the e-token inside the network. In response to a request for access to the space, the access controls include sending the e-token outside of the network for verification. Upon successful verification of the e-token, the access controls include accessing the network and controlling a guard bot inside the network to grant access for the second member to the space. The guard bot adds the second member to an access control list.

6 Claims, 2 Drawing Sheets

METHOD, SYSTEM, AND COMPUTER PROGRAM PRODUCT FOR PROVIDING E-TOKEN BASED ACCESS CONTROL FOR VIRTUAL WORLD SPACES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to network access controls, and particularly to a method, system, and computer program product for providing e-token based access control for virtual world spaces.

2. Description of Background

Before our invention, virtual world (VW) systems lacked the ability for an avatar (whose is a member of a particular private VW system space) to provide an entry ticket to another avatar (who is a member of the VW system but not a member of the private VW space to which the first avatar belongs) that would allow the other avatar access to the private VW space (e.g., an island or parcel). Nor do these VW systems provide for automated limitations or conditions to the access once it is granted. Existing solutions rely on some pre-existing relationship between the avatar and the other avatar (e.g., through database registration) but do not address providing entry tickets to avatars with which no previous relationship exists.

What is needed, therefore, is a way to provide access to a VW space that does not rely on pre-existing relationships among avatars, and which utilizes conditions or limits of access.

SUMMARY OF THE INVENTION

The shortcomings of the prior art are overcome and additional advantages are provided through a method for providing e-token based access control to virtual world spaces includes intercepting a request from a first VW member to invite a second VW member to a VW space within a VW network, the request intercepted outside of the VW network. The access controls also include using a secret code associated with the first VW member to generate an e-token, the e-token including a name or identifier of the second VW member and an identifier of the VW space. The access controls further include sending the e-token inside the VW network for storage. In response to a request, by the second VW member, for access to the VW space, the access controls include sending the e-token outside of the VW network for verification. Upon successful verification of the e-token outside of the VW network, the access controls include accessing the VW network and controlling a guard bot residing inside the VW network to grant access to the second VW member with respect to the VW space. The guard bot adds the second VW member to an access control list for the VW space.

System and computer program products corresponding to the above-summarized methods are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which provides e-token based access controls for VW spaces. The e-token based access controls provide access to a VW space that does not rely on pre-existing relationships among users.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
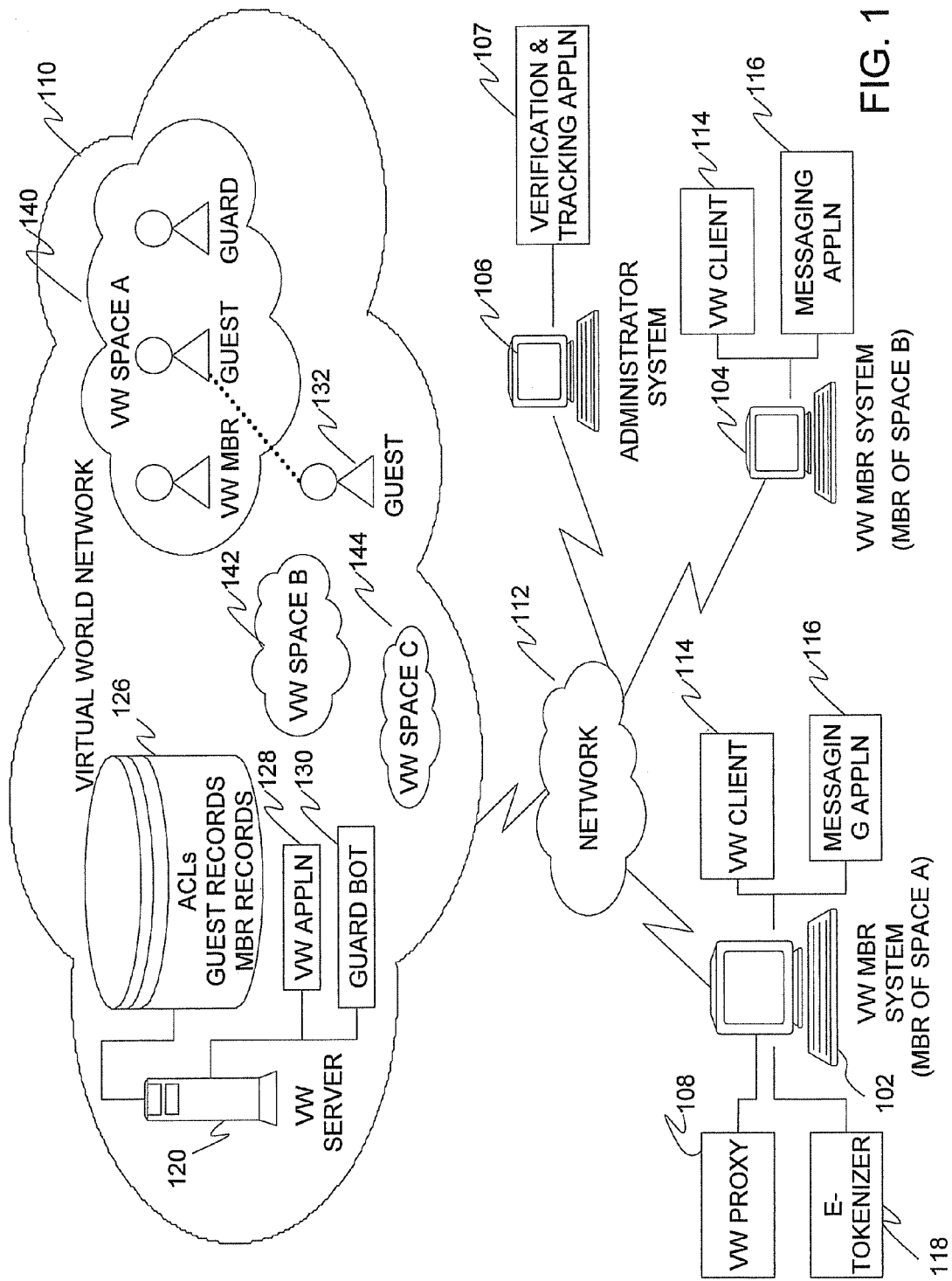
FIG. 1 illustrates one example of a system upon which e-token based access controls for virtual world spaces may be implemented.

Turning now to the drawings in greater detail, it will be seen that in FIG. 1 there is depicted a system upon which e-token based access controls for virtual world (VW) spaces may be implemented in an exemplary embodiment. The e-token based access controls provide access to a VW space that does not rely on pre-existing relationships among users (e.g., avatars). A virtual world (VW) network includes one or more VW spaces.

The following definitions are provided for ease of description.

Virtual world. A virtual world refers to a computer-based environment that includes real world-based objects (avatars, personalities, icons, places, etc.) used by users who interact and inhabit one or more VW spaces in the virtual world.

Virtual world space. A virtual world space refers to a specific portion of a virtual world for which access is granted to a select group of users (i.e., VW space members).

Avatar. A computer-based graphical or text-based representation of a user in a virtual world.

The system of FIG. 1 includes virtual world (VW) member systems 102 and 104, an administrator system 106, and a virtual world (VW) network 110, each of which is in communication with a network 112. A virtual world (VW) server 120, which is implemented inside of the VW network 110, may serve as the interface between the VW network 110 and other network entities (e.g., VW member systems 102/104 and administrator system 106).

The VW server 120 may be implemented as a high-speed computer processing device, e.g., mainframe computer that handles large volumes of data, applications, and associated transactions. By way of illustration, the VW server 120 may be one of IBM's® z™ series mainframes. The VW server 120 may include internal storage (e.g., hard disk drives, disk arrays, magnetic tape media, optical disk drives, etc.). Alternatively, the VW server 120 may be implemented using a cluster of smaller computers.

The VW server 120 executes a virtual world (VW) application 128 for enabling members of the VW network 110 to communicate with one another, share information and resources, and other options typically provided in a VW system. In other words, the VW application 128 implements all of the logic associated with the VW network 110. The VW server 120 is in communication with a storage device 126, which stores information, such as access control lists (ACLs), guest records (e.g., records of invitees of a private VW space), and VW member records. Each of the ACLs may store membership information for those users/avatars who are authorized members and guests of the VW network 110. In one embodiment, a separate ACL is stored for each VW space in the network 110. In one embodiment, the guest and member records are used to identify users who are currently accessing the VW network 110 (or one of the VW network spaces) and to track usage, such that the VW network 110 does not become overloaded, thereby impairing the speed and operation of the VW network 110.

As shown in FIG. 1, the VW network 110 may include multiple VW spaces (e.g., VW spaces A 140, B 142, and C 144). For purposes of illustration, VW member system 102 is operated by a user whose avatar is a member of VW space A 140 only and VW member system 104 is operated by a user whose avatar is a member of VW space B only. A VW member may be authorized, via the VW application 128, to access one or more of the VW spaces A-C. The e-token based access control system enables a VW user, who is a member of a VW space (e.g., VW space A 140) to initiate access to the VW space for VW members who are not members of the VW space. In addition, the e-token based access control system may enable the VW members to initiate access to a VW space (e.g., VW space C 144) to which neither the requesting VW member nor the invitee VW member belong.

In an exemplary embodiment, a guard bot 130 is executing on the server 120 in the VW network 110. The guard bot 130 interfaces with the administrator system 106 to control access to VW spaces A-C in the network 110 as described further herein. The guard bot 130 may also enforce any conditions of access to the network 110 as described further herein.

The VW member systems 102, 104 may be operated by authorized members of the VW network 110. Each of the VW member systems 102, 104 may be implemented by any type of computer processing system (e.g., general-purpose computer). Each of the VW member systems 102, 104 accesses the VW network 110 via a virtual world (VW) client application 114 executing on the respective member systems 102/104. In an exemplary embodiment, the VW member systems 102, 104 also execute messaging applications 116 (e.g., email, instant messaging, and chat room, to name a few). It will be understood that the messaging applications 116 may be components of the respective VW client applications 114, whereby users of the member systems 102/104 communicate inside of the VW network 110 via the messaging applications 116 and the VW client applications 114.

For purposes of illustration, and as indicated above, the VW member system 102 is operated by a user who is a member of a group for which access to a private virtual world space (i.e., VW space A 140) has been granted, and to which the VW member system 104 does not belong. Likewise, although not necessary to realize the advantages of the invention, the VW member system 104 may belong to a group for which access to a different private virtual world space (i.e., VW space B 142) has been granted, and to which the VW member system 102 does not belong. As members of different virtual world spaces within the VW network 110, the VW member systems 102, 104 may have no previous or existing relationship with each other.

The VW member system 102 executes a VW proxy 108, which intercepts specified requests from the VW member system 102 as described further herein. The VW proxy 108 communicates with an e-tokenizer application 118 and, optionally, a user interface (not shown). The e-tokenizer application 118 is also executed by the VW member system 102 and generates e-tokens in response to requests from the VW member system 102. The user interface (not shown) enables the VW member system 102 to enter information in response to verification prompts from the VW proxy 108. These activities are described further herein.

The administrator system 106 is operated by an entity that validates e-tokens for guests (e.g., VW member system 104) requesting entry to a VW space to which the guest does not belong. The administrator system 106 executes a verification and tracking application 107 which, in conjunction with the VW proxy 108, e-tokenizer application 118, and guard bot 130, facilitate the e-token based access controls of the invention. The administrator system 106 may be implemented by any type of computer processing system (e.g., general-purpose computer). As shown in FIG. 1 the administrator system 106 (as well as the VW member systems 102, 104) reside outside of the VW network 110.

The administrator system 106 includes memory for storing information used in performing verifications of e-tokens. For example, if a digital signature private key of the VW member system 102 (and other ones) is used to generate the e-token, the administrator system 106 may maintain a list of identifiers (e.g., public keys) for the VW member system 102 (and other ones).

Network 112 may be any type of known network including, but not limited to, a wide area network (WAN), a local area network (LAN), a global network (e.g. Internet), and an intranet.

Figure 2:
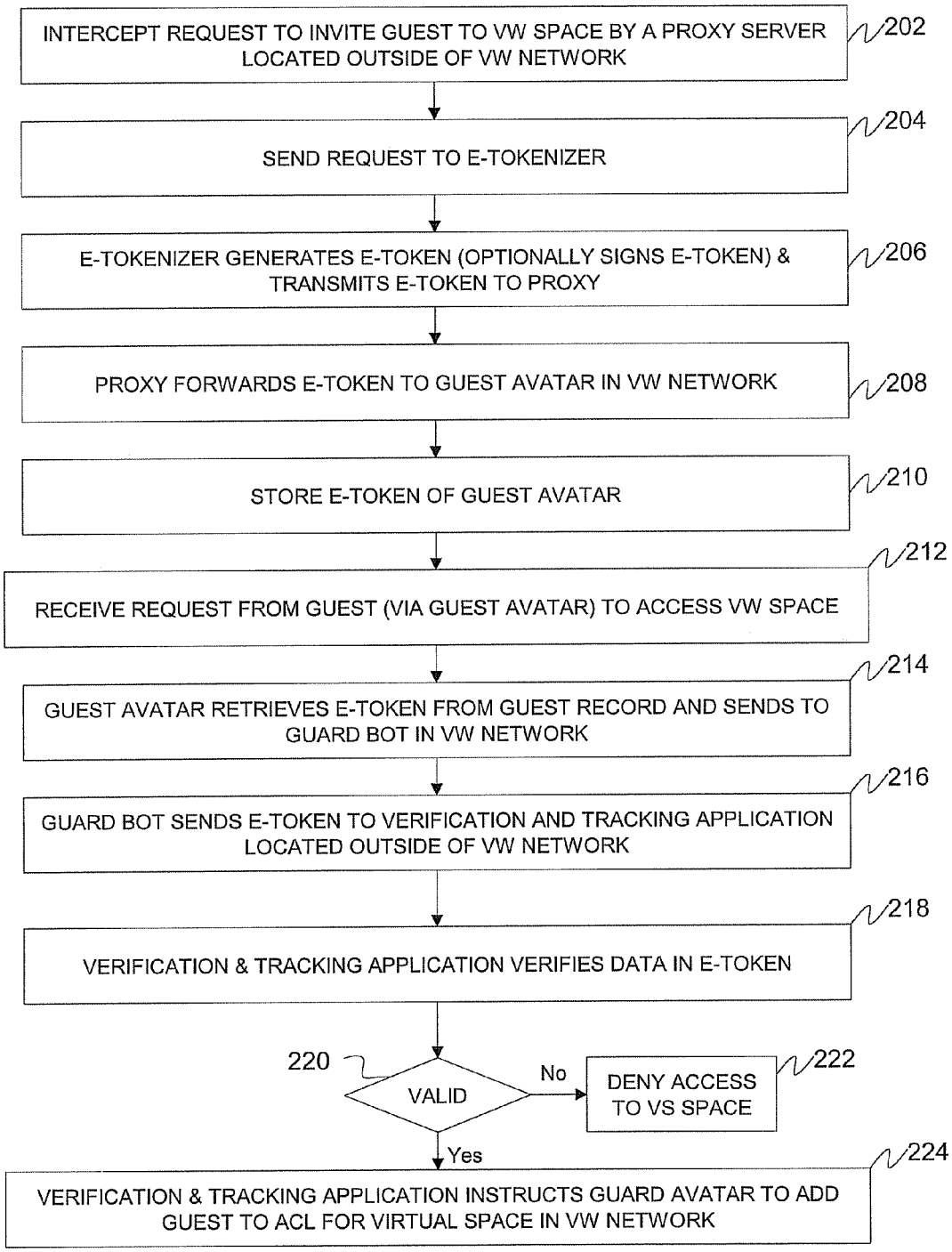
FIG. 2 illustrates one example of a flow diagram describing a process for implementing e-token based access controls for virtual world spaces.

Turning now to FIG. 2, a process for implementing the e-token based access controls will now be described. For purposes of illustration, it is assumed that the VW member on system 102 is communicating with the VW member on system 104 via the respective messaging applications 116. The VW member of system 102 may be an engineer or research scientist and the VW member of system 104 may be a journalist or other party who is interested in learning more about the member's (on system 102) work, which is performed and recorded within the VW network 110 (e.g., in VW space A 140). The VW member systems 102/104, while members of the VW network 110, have no current or previous relationship other than the messaging communication via applications 116. It is also assumed that the VW member system 102 desires to invite the VW member system 104 to access the VW space A 140 in order to provide the VW member system 104 with additional information. The VW member system 102 accesses the VW network 110 via the VW client application 114.

The VW member system 102 issues a request via the VW client application 114 to invite the VW member system 104 to the VW space A 140, which is intercepted by the VW proxy 108 at step 202. The VW proxy 108 is configured to intercept such requests (e.g., any request with "invite" in the subject line).

At step 204, the VW proxy 108 forwards the request to the e-tokenizer application 118, which in turn, generates an e-token and transmits the e-token to the VW proxy 108 at step 206. In one embodiment, the VW member system 102 may be prompted to enter a secret code via the user interface (not shown). The secret code may be, e.g., a password to unlock the signature private key which is stored in an encrypted way within the e-tokenizer 118 or a hardware token used by the e-tokenizer 118. The e-token that is generated includes information, such as the name of the guest (invitee), the identity of the virtual space to which access is requested, and various conditions of access, which are described further herein.

At step 208, the VW proxy 108 forwards the e-token over the network 112 to the avatar of an invitee (e.g., a guest avatar 132) in the VW network 110. The guest avatar 132 in the VW network 110 communicates with the storage device 126 via the VW server 120. The e-token is stored in a repository for the guest avatar (e.g., storage device 126) at step 210. The e-token remains in the storage device 126 awaiting activation by the invitee (e.g., VW member system 104) as will now be described in steps 212 through 224.

At step 212, the VW member system 104 accesses the VW network 110 and requests access to the VW space A 140 via the guest avatar 132. It will be understood that the guest avatar 132 of the invitee may be the same avatar used by the user as a member of another VW space. For example, if the invitee of VW space 140 is a member of VW space 142, the member's avatar used in VW space 142 may be identical to the guest avatar used in the space 140 to which he/she is invited. The guest avatar 132 retrieves the corresponding e-token from the storage device 126 and sends the e-token to the guard bot 130 in the VW network 110 at step 214. The guard bot 130, in turn, sends the e-token over the network 112 to the verification and tracking application 107 at step 216. The verification and tracking application 107 verifies the data in the e-token at step 218. As indicated above, the verification may include confirming that the signature on the invitation is valid or any other appropriate form of authentication, (e.g., implemented via signature, shared secret or private code, etc.) provided by the VW member system 102 is valid.

At step 220, it is determined whether the e-token is valid. If not, at step 222, the verification and tracking application 107 contacts the guard bot 130 and instructs the guard bot 130 to deny access (i.e., refrain from adding the guest to the ACL and, optionally, notifying the guest) to the VW space A 140. Otherwise, if the e-token is valid at step 224, the verification and tracking application 107 contacts the guard bot 130 and instructs the guard bot 130 to add the guest (user of member system 104) to the ACL for VW space A 140 in storage device 126 at step 224. The guard bot 130 will implement the conditions in the token by acting accordingly on the ACL, e.g., by removing the guest from the ACL in when the invitation is for a time-limited stay. The actual enforcement is then done by the VW system 110 as it acts on the ACL and can eject an avatar that is no longer on the ACL. The guest is permitted to enter the VW space A 140 pursuant to the conditions (if any) in the e-token, as shown by the dotted lines between the guest avatar 132 and the guest avatar in VW space A 140.

As indicated above, the request to invite the VW member (of system 104—also referred to herein as "guest member") may include conditions for accessing the VW space (e.g., VW space A 140). The conditions may include, e.g., a date in which the guest member is granted access, a length of time for which the guest member is granted access, limitations on activities performed by the guest member, and a capacity limit including a maximum number of users that are granted access to the VW space at one time. The verification and tracking application 107 stores the conditions in the database 126 (e.g., in the guest records) within the VW network 110, and changes the ACL according to the conditions (e.g., indicating access during the specified date/time and/or subject to the capacity limits).

In another embodiment, the verification and tracking application 107 is implemented in conjunction with a guard avatar within the VW network 110. It will be understood that a guard avatar may be implemented for each VW space within the VW network 110 or a single guard avatar may be assigned to the entire VW network 110.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing e-token based access control to virtual world (VW) spaces, comprising:

intercepting a request including an invitation for access to a first VW space from a first VW member associated with the first VW space to a second VW member associated with a second VW space, the first and second VW spaces being located within a VW network, the request being intercepted outside of the VW network;

using a secret code associated with the first VW member to generate an e-token, the e-token including a name or identifier of the second VW member and an identifier of the first VW space;

sending the e-token inside the VW network for storage;

in response to a request, by the second VW member, for the access to the first VW space, sending the e-token outside of the VW network for verification, the verification including determining whether a number of users that may be granted access to the first VW space has been exceeded; and upon successful verification of the e-token outside of the VW network, accessing the VW network and controlling a guard bot residing inside the VW network to grant the access to the second VW member with respect to the first VW space upon verifying that the number of users to the first VW space has not been exceeded;

wherein the guard bot adds the second VW member to an access control list for the first VW space.

2. The method of claim 1, wherein the secret code is a private key of a public key/private key pair of the first VW member and the verification of the e-token includes validating whether the identity of the first VW member is an authorized identity for issuing invitations for the VW space.

3. The method of claim 1, wherein the request to invite the second VW member further includes conditions for accessing the VW space, comprising:

a date in which the second VW member is granted access;
a length of time for which the second VW member is granted access;
limitations on activities performed by the second VW member in the VW space; and
a capacity limit including a maximum number of users that are granted access to the VW space at one time;
the method further comprising:
storing the conditions in a database outside of the VW network;
granting access to the second VW member pursuant to the conditions; and
ejecting the second VW member from the VW space when the terms of the conditions have expired.

4. A system for providing e-token based access control to virtual world (VW) spaces, comprising:
a VW server;
an administrator system executing a verification and tracking application;
a first VW member system in communication with the VW server and the administrator system; and
a proxy application and an e-tokenizer application executing on the first VW member system, the proxy application and the e-tokenizer application implementing a method, comprising:
the proxy application intercepting a request from the first VW member system to invite a second VW member system to a VW space within a VW network, the request intercepted outside of the VW network;
the e-tokenizer application using a secret code associated with the first VW member system to generate an e-token, the e-token including a name of identifier of the second VW member system and an identifier of the VW space;
sending the e-token inside the VW network for storage;
in response to a request, by the second VW member system, for access to the VW space, sending the e-token outside of the VW network to the verification and tracking application for verification, the verification including determining whether a number of users that may be granted access to the first VW space has been exceeded; and
upon successful verification of the e-token, the verification and tracking application accesses the VW network and controls a guard bot residing inside the VW network to grant the access to the second VW member with respect to the VW space upon verifying that the number of users to the first VW space has not been exceeded;
wherein the guard bot adds the second VW member to an access control list for the VW space.

5. The system of claim 4, wherein the secret code is a private key of a public key/private key pair of the first VW member and the verification of the e-token includes validating whether the identity of the first VW member is an authorized identity for issuing invitations for the VW space.

6. The system of claim 4, wherein the request to invite the second VW member further includes conditions for accessing the VW space, comprising:
a date in which the second VW member is granted access;
a length of time for which the second VW member is granted access;
limitations on activities performed by the second VW member in the VW space; and
a capacity limit including a maximum number of users that are granted access to the VW space at one time;
the method further comprising:
storing the conditions in a database outside of the VW network;
granting access to the second VW member pursuant to the conditions; and
ejecting the second VW member from the VW space when the terms of the conditions have expired.

* * * * *